United States Patent
Son et al.

(10) Patent No.: US 11,565,697 B2
(45) Date of Patent: Jan. 31, 2023

(54) VEHICLE EQUIPPED WITH ELECTRIC MOTOR AND PARKING CONTROL METHOD THEREFOR

(71) Applicants: HYUNDAI MOTOR COMPANY, Seoul (KR); KIA MOTORS CORPORATION, Seoul (KR)

(72) Inventors: Hui Un Son, Suwon-si (KR); Sang Joon Kim, Seoul (KR); Kyu Hwan Jo, Yongin-si (KR); Sung Bae Jeon, Ansan-si (KR); Sung Hoon Yu, Hwaseong-si (KR); Joo Young Kim, Hwaseong-si (KR); Jin Kyeom Cho, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 120 days.

(21) Appl. No.: 16/953,592

(22) Filed: Nov. 20, 2020

(65) Prior Publication Data
US 2021/0179107 A1 Jun. 17, 2021

(30) Foreign Application Priority Data
Dec. 16, 2019 (KR) .......... 10-2019-0167880

(51) Int. Cl.
*B60W 30/18* (2012.01)
*B60W 30/06* (2006.01)
(Continued)

(52) U.S. Cl.
CPC ......... *B60W 30/18063* (2013.01); *B60T 7/22* (2013.01); *B60W 10/18* (2013.01);
(Continued)

(58) Field of Classification Search
CPC .......... B60W 30/18063; B60W 10/18; B60W 30/06; B60W 40/13; B60W 2510/083;
(Continued)

(56) References Cited

U.S. PATENT DOCUMENTS 5,775,784 A * 7/1998 Koga ................... B60L 3/0023
303/3
6,341,584 B1 * 1/2002 Itoyama .................. F01L 1/34
903/918
(Continued)

FOREIGN PATENT DOCUMENTS

KR 20-0408057 Y1 2/2006
KR 2010-0113245 A 10/2010
(Continued)

*Primary Examiner* — Yazan A Soofi
*Assistant Examiner* — Naeem Taslim Alam
(74) *Attorney, Agent, or Firm* — McDonnell Boehnen Hulbert & Berghoff LLP

(57) ABSTRACT

The present disclosure relates to a vehicle and a parking control method therefor which can prevent a parking curb or a driving system from being damaged during parking due to collision with the parking curb or running over the parking curb according to creep torque imitation by an electric motor in a vehicle equipped with the electric motor. A parking control method includes determining whether a parking situation occurs, applying a creep torque modification coefficient to a creep torque until contact with an object that applies a reaction force to a wheel in a parking direction is sensed to determine a modified creep torque upon determining the parking situation, and variably controlling the creep torque by applying a variable coefficient to the modified creep torque.

19 Claims, 10 Drawing Sheets

(51) Int. Cl.
  *B60W 40/13*      (2012.01)
  *B60W 10/18*      (2012.01)
  *B60T 7/22*       (2006.01)
  *G06V 20/58*      (2022.01)

(52) U.S. Cl.
  CPC ............ *B60W 30/06* (2013.01); *B60W 40/13* (2013.01); *G06V 20/586* (2022.01); *B60W 2510/083* (2013.01); *B60W 2540/10* (2013.01); *B60W 2540/12* (2013.01)

(58) Field of Classification Search
  CPC .......... B60W 2540/10; B60W 2540/12; G06V 20/586; B60T 7/22
  See application file for complete search history.

(56) References Cited

U.S. PATENT DOCUMENTS

| | | | |
|---|---|---|---|
| 11,325,581 B2* | 5/2022 | Ebuchi | B60W 50/082 |
| 2005/0099146 A1* | 5/2005 | Nishikawa | B60L 7/18 |
| | | | 318/63 |
| 2008/0015743 A1* | 1/2008 | Haug | B60T 7/22 |
| | | | 701/1 |
| 2008/0119323 A1* | 5/2008 | Kitaori | F16H 61/20 |
| | | | 477/97 |
| 2010/0235043 A1* | 9/2010 | Seta | B60L 3/0076 |
| | | | 701/29.2 |
| 2013/0142011 A1* | 6/2013 | Hallek | G01S 7/527 |
| | | | 367/87 |
| 2016/0264020 A1* | 9/2016 | Ochocinski | B60L 15/2063 |
| 2016/0325748 A1* | 11/2016 | Mori | B60W 10/08 |
| 2017/0072960 A1* | 3/2017 | Huh | F16H 61/20 |
| 2017/0080927 A1* | 3/2017 | Suzuki | B60R 16/0232 |
| 2018/0093662 A1* | 4/2018 | Kim | B60W 30/06 |
| 2018/0339702 A1* | 11/2018 | Kim | G06V 20/58 |
| 2019/0001965 A1* | 1/2019 | Cho | B60W 10/06 |
| 2019/0299979 A1* | 10/2019 | Sadakiyo | B62D 15/0285 |
| 2019/0299980 A1* | 10/2019 | Harai | B60G 17/06 |
| 2021/0107507 A1* | 4/2021 | Matsunaga | B62D 15/0285 |
| 2021/0172517 A1* | 6/2021 | Imamura | B60W 30/19 |
| 2021/0331677 A1* | 10/2021 | Kim | G06N 3/0454 |
| 2021/0354691 A1* | 11/2021 | Nave | G05D 1/0088 |

FOREIGN PATENT DOCUMENTS

| | | |
|---|---|---|
| KR | 2012-0059789 A | 6/2012 |
| KR | 20-0465213 Y1 | 2/2013 |
| KR | 10-1936463 B1 | 1/2019 |

* cited by examiner

PRIOR ART
FIG. 4A
FIG. 4B
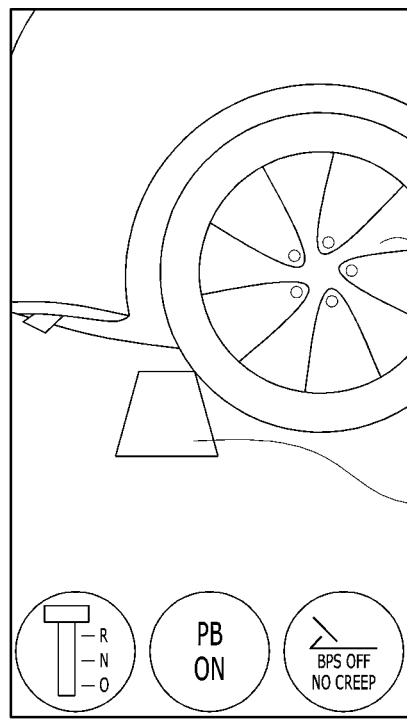
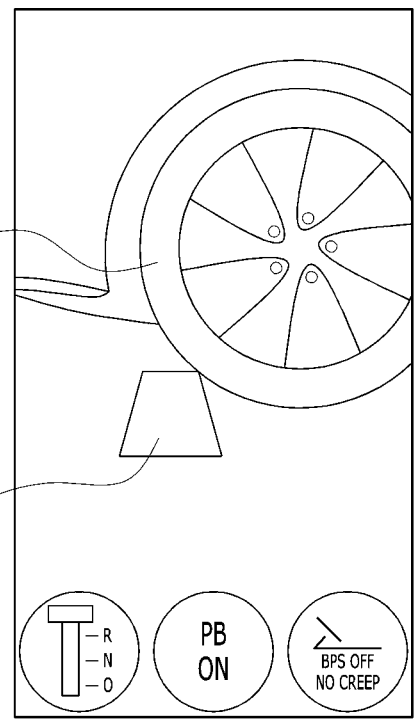

VEHICLE EQUIPPED WITH ELECTRIC MOTOR AND PARKING CONTROL METHOD THEREFOR

CROSS REFERENCE TO RELATED APPLICATIONS

This application claims the benefit of Korean Patent Application No. 10-2019-0167880, filed on Dec. 16, 2019, which is hereby incorporated by reference as if fully set forth herein.

BACKGROUND

Field

The present disclosure relates to a vehicle and a parking control method therefor which can prevent a parking curb or a driving system from being damaged during parking due to collision with the parking curb or running over the parking curb according to creep torque imitation by an electric motor in a vehicle equipped with the electric motor.

Discussion of the Related Art

Although vehicle driving is important, parking is also important when driving because driving ends with parking. In such a parking process, various devices are used.

For example, a parking brake or a P stage of a transmission is used to prevent a vehicle having arrived at a parking position from moving from the position. This is described with reference to FIGS. 1 and 2.

FIG. 1 is a diagram for describing the operation principle of a P stage of a general transmission and FIG. 2 is a diagram for describing the operation principle of a general parking brake.

Referring to FIG. 1, the P stage of the transmission prevents movement of the vehicle in such a manner that a protrusion 131 of a parking sprag 130 is engaged with a parking gear 120 fixed to a rotation shaft 110 of a transmission output stage so as to mechanically fix the rotation shaft 110 of the transmission output stage. However, the protrusion 131 of the parking sprag 130 may be damaged when large load is applied to the rotation shaft 110, and the protrusion 131 gradually wears down due to cumulative usage thereof and thus may cease to function.

A parking brake is useful to stop a vehicle for a long time or to prevent movement of a vehicle in a steeply inclined place, and can be used for emergency when a foot brake fails and has an operation circuit independent of the foot brake. Referring to FIG. 2, typical parking brake mainly uses a drum brake composed of a drum 210 and a pad 220 which prevents rotation of the drum by pressing against the inner circumferential face of the drum 210 when a wire 230 is operated inside the drum 210.

Further, a parking assistant system (PAS) which monitors a space in the range of 0.25 m to 1.5 m using four to six ultrasonic sensors provided in a front or rear bumper and notifies a driver of presence of an obstacle using a warning sound in a parking process may be used. Such a parking assistant system is generally composed of ultrasonic sensors and a warning device. Recently, a smart parking assistant system which checks presence or absence of an appropriate parking space for a corresponding vehicle and automatically controls even steering has been introduced.

Meanwhile, demand for eco-friendly vehicles is increasing as fuel efficiency improvement of vehicles is constantly demanded and exhaust gas regulations of each country are tightened. As a practical alternative to this, a hybrid electric vehicle/plug-in hybrid electric vehicle (HEV/PHEV) and an electric vehicle (EV) are provided.

Hybrid electric vehicles/plug-in hybrid electric vehicles (HEV/PHEV) and electric vehicles (EV) commonly include an electric motor. Particularly, creep torque control is applied in a parking process such that the electric motor imitates low-speed characteristics of a vehicle equipped with an internal combustion engine and an automatic transmission (A/T). Here, a creep torque means that an idle torque of an engine is transmitted to a drive shaft through a torque converter in a state in which an accelerator pedal is not depressed in a vehicle equipped with an internal combustion engine and an automatic transmission, and a creep phenomenon refers to a phenomenon in which a vehicle slowly travels due to this creep torque. When the creep phenomenon occurs, a vehicle normally travels at 10 kph or less. Since eco-friendly vehicles normally travel using only electric motors without driving engines in low-speed situations for fuel efficiency, the creep phenomenon is imitated through electric motors. FIG. 3 illustrates an example of creep torque control of a prior art vehicle equipped with a general electric motor.

Referring to FIG. 3, the electric motor of eco-friendly vehicles operates with a positive torque before a certain vehicle speed in a situation in which an accelerator pedal is not operated and operates with a negative torque after the certain vehicle speed in order to imitate engine drag. Here, a region in which the electric motor operates with the positive torque corresponds to a creep torque region in which the creep torque is imitated. Here, the horizontal axis may represent a brake pedal sensor (BPS) value instead of a vehicle speed.

However, when eco-friendly vehicles are parked, problems due to a parking curb may be generated due to the creep torque. This will be described with reference to FIG. 4.

FIGS. 4A and 4B are diagrams for describing problems that may be generated in a situation in which a general eco-friendly vehicle is parked. FIGS. 4A and 4B assume a case in which a parking process is performed in such a manner that the vehicle is backed into a parking space and a parking brake and a P stage are operated as rear wheels 310 reach a parking curb 320.

First, in both a case where the parking brake is operated after shifting to the P stage and a case where the parking brake is operated before shifting to the P stage, the tires of the rear wheels 310 push the parking curb 320 as illustrated in FIG. 4A. In this case, load is applied to the P-stage gear and thus the P-stage gear may be damaged, and impact is applied to the transmission after release of the P stage in the former case. In the latter case, load is constantly applied to the parking brake because the types push the parking curb and thus durability of the parking brake may deteriorate, and the same problem as that in the former case may be generated when the parking brake is pushed over time.

Furthermore, the rear wheels 310 may move over the parking curb 320 due to the creep torque in an extreme case, as illustrated in FIG. 4B. In this case, load greater than that in the situation illustrated in FIG. 4A may be applied to each brake means, and when the driver on the front seat does not recognize this, the problem becomes serious.

To prevent the above-described situation, there is a method of recognizing contact between the rear wheels 310 and the parking curb 320, switching to an N stage to cancel the contact state between the rear wheels 310 and the parking curb 320 and then operating the parking brake or the P stage. However, this is difficult to operate.

Accordingly, a method capable of detecting a parking curb during parking and preventing a driving system or the parking curb from being damaged through appropriate control is required.

SUMMARY

An object of the present disclosure is to provide a vehicle and a parking control method therefor which can prevent a parking curb or a driving system from being damaged due to collision with the parking curb when a vehicle equipped with an electric motor is parked.

It will be appreciated by persons skilled in the art that the objects that could be achieved with the present disclosure are not limited to what has been particularly described hereinabove and the above and other objects that the present disclosure could achieve will be more clearly understood from the following detailed description.

To achieve these objects and other advantages and in accordance with the purpose of the disclosure, as embodied and broadly described herein, a parking control method for a vehicle imitating a creep torque using an electric motor according to an embodiment of the present disclosure includes determining whether a parking situation occurs, applying a creep torque modification coefficient to a creep torque until contact with an object that applies a reaction force to a wheel in a parking direction is sensed to determine a modified creep torque upon determining the parking situation, and variably controlling the creep torque by applying a variable coefficient to the modified creep torque.

In another aspect of the present disclosure, a vehicle imitating a creep torque using an electric motor includes a creep torque modifying unit for determining whether a parking situation occurs and applying a creep torque modification coefficient to a creep torque to determine a modified creep torque upon determining the parking situation, a sensing unit for sensing contact with an object that applies reaction force to a wheel in a parking direction while the creep torque modifying unit determines the modified creep torque, and a creep torque controller for variably controlling the creep torque by applying a variable coefficient to the modified creep torque when the sensing unit senses contact with the object.

In a vehicle equipped with an electric motor according to at least one embodiment of the present disclosure configured as above, a driving system can be prevented from being damaged through creep torque control in consideration of a parking curb during parking.

It will be appreciated by persons skilled in the art that the effects that can be achieved with the present disclosure are not limited to what has been particularly described hereinabove and other advantages of the present disclosure will be more clearly understood from the following detailed description.

BRIEF DESCRIPTION OF THE FIGURES

FIGS. 4A and 4B are diagrams for describing problems that can be generated in a parking situation of a general eco-friendly vehicle of the prior art.

DETAILED DESCRIPTION

Figure 1:
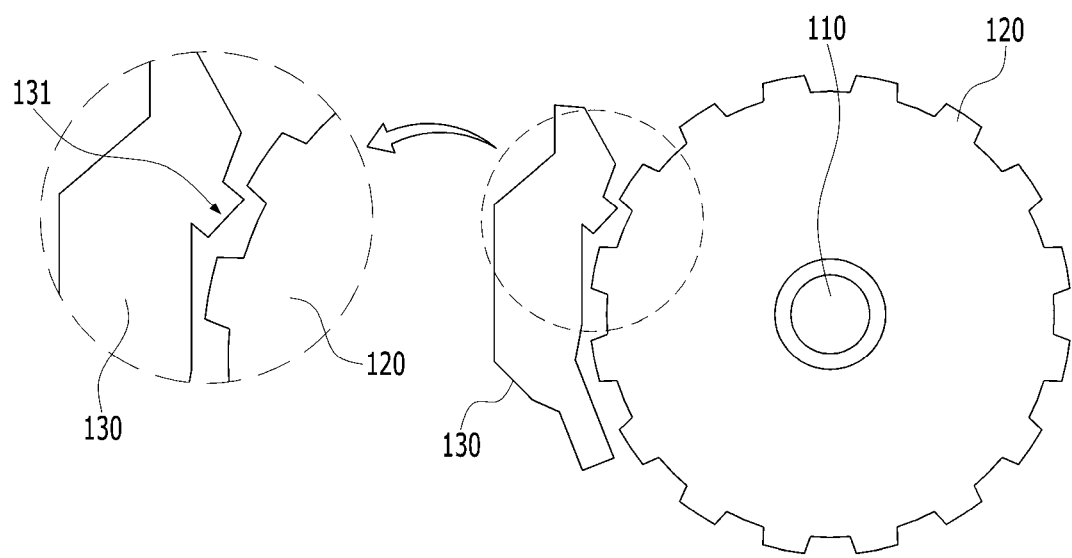
FIG. 1 is a diagram for describing the operation principle of a P stage of a general transmission of the prior art.
Figure 2:
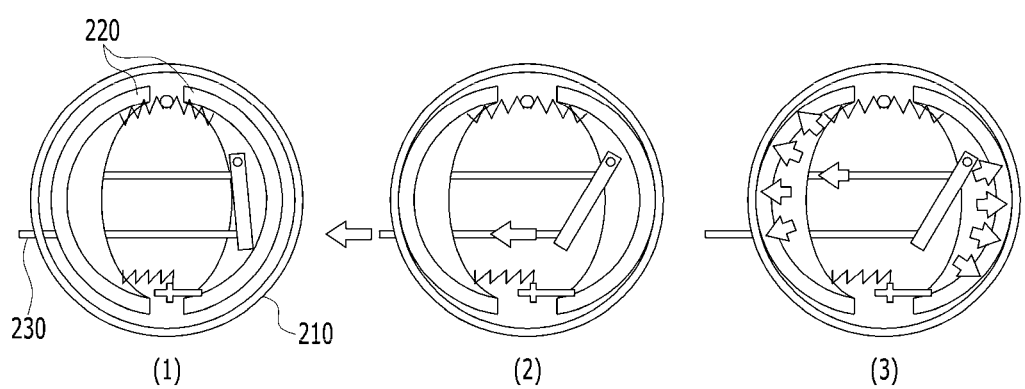
FIG. 2 is a diagram for describing the operation principle of a general parking brake of the prior art.
Figure 3:
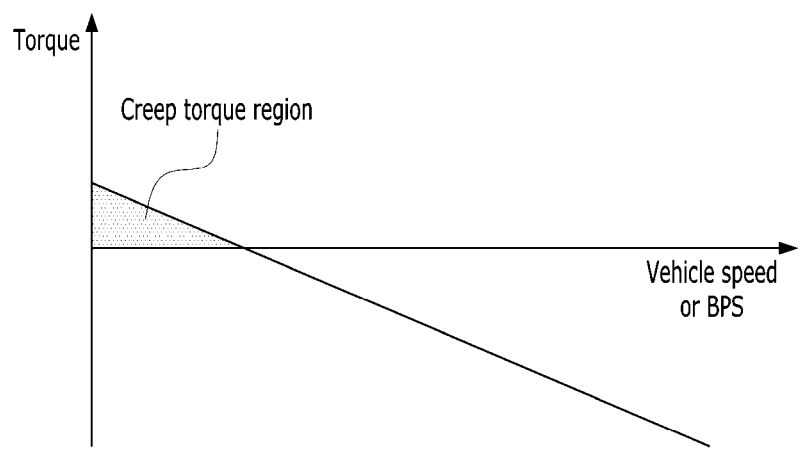
FIG. 3 illustrates an example of creep torque control of a vehicle equipped with a general electric motor of the prior art.

The detailed description of the exemplary embodiments of the present disclosure will be given to enable those skilled in the art to implement and practice the disclosure with reference to the attached drawings. However, the present disclosure can be implemented in various different forms and is not limited to embodiments described herein. In addition, parts that are not related to the description will be omitted for clear description in the drawings, and the same reference numbers will be used throughout this specification to refer to the same or like parts.

Throughout the specification, when it is said that some part "includes" a specific element, this means that the part may further include other elements, not excluding the same, unless mentioned otherwise. In addition, parts denoted by the same reference numeral refer to the same component throughout the specification.

In a vehicle equipped with an electric motor according to an embodiment of the present disclosure, a creep torque is variably controlled in a parking situation in consideration of a parking curb to mitigate impact due to the parking curb.

First, a vehicle configuration for performing creep torque control according to an embodiment of the present disclosure will be described with reference to FIG. 5.

Figure 5:
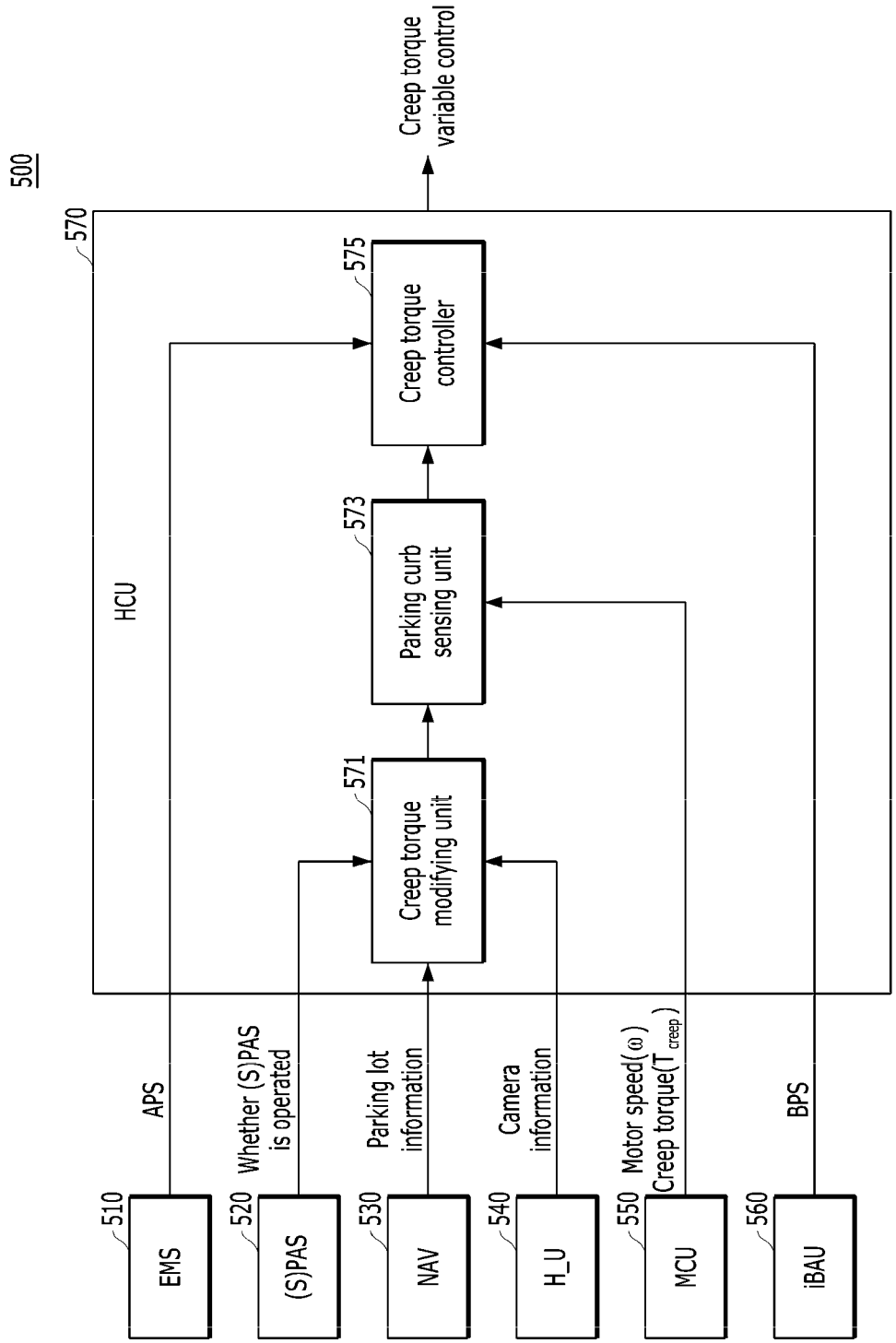
FIG. 5 is a block diagram illustrating an example of a vehicle configuration according to an embodiment of the present disclosure.

FIG. 5 is a block diagram illustrating an example of a vehicle configuration according to an embodiment of the present disclosure.

For convenience, it is assumed that a vehicle equipped with an electric motor is a hybrid electric vehicle (PHEV/HEV) in the following figures including FIG. 5. However, it is obvious to those skilled in the art that components other than components (e.g., an engine management system) applied to only hybrid electric vehicles can be applied to eco-friendly vehicles such as electric vehicles (EV) and hydrogen fuel cell vehicles (HFCV).

Referring to FIG. 5, a hybrid electric vehicle 500 according to an embodiment may include an engine management system (EMS) 510 for controlling an internal combustion engine, a parking assistance (SPAS/PAS) control unit 520, a navigation system 530, a head unit 540 equipped with a display, a motor control unit (MCU) 550 for controlling an electric motor, an integrated brake actuation unit (iBAU) 560 for controlling braking, and a hybrid controller unit (HCU) 570 that is a higher control unit of the aforementioned control units. In the case of electric vehicles other than hybrid electric vehicles, the engine management system 510 may be omitted, the motor control unit 550 or other control units may serve as the engine management system 510, and the hybrid controller unit 570 may be substituted by a vehicle control unit (VCU).

The hybrid controller unit 570 may include a creep torque modifying unit 571, a parking curb sensing unit 573, and a creep torque controller 575.

The operation of the creep torque modifying unit 571 will be described with reference to FIGS. 6A and 6B.

Figure 6A:
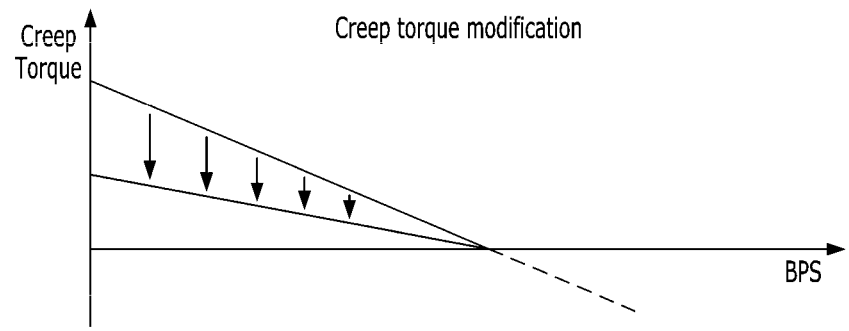
FIG. 6A illustrates an example of an operation of a creep torque modifying unit according to an embodiment of the present disclosure.

FIG. 6A illustrates an example of the operation of the creep torque modifying unit according to an embodiment of the present disclosure.

The creep torque modifying unit 571 can determine whether a parking situation occurs and decrease creep torque in a parking situation. For example, the creep torque modifying unit 571 may determine a parking situation through methods of checking whether the parking assistance control unit 520 executes an SPAS/PAS function, checking whether the vehicle enters a parking lot through the navigation system 530, recognizing parking curbs or parking lines in an image of a front or rear camera acquired from the head unit 540, and the like. In the case of an HEV/PHEV, a parking situation may be determined with reference to charging stations as well as parking lots.

Upon confirmation of a parking situation, the creep torque modifying unit can decrease a creep torque $T_{creep}$ in response to a BPS value and output a modified creep torque $T_{creep,mody}$ when the creep torque is positive (+), as illustrated in FIG. 6A. Here, the modified creep torque $T_{creep,mody}$ can be obtained by multiplying the $T_{creep}$ by a modification coefficient $k_{mody}$. Here, a minimum value $k_{mody,min}$ of $k_{mody}$ is determined as a value equal to or greater than vehicle rolling resistance when a driver does not operate the brake pedal (i.e., '$k_{mody,min}=(T_{RollingResistance}+$ margin$)/T_{creep,max}$', '$T_{RollingResistance}$' being a torque corresponding to rolling resistance), and a maximum value $k_{mody,max}$ may be 1 in order not to exceed the previous creep torque $T_{creep}$ or may be a value predetermined through tests (i.e., $k_{mody,min}<k_{mody}<k_{mody,max}$).

An initial value $k_{mody,initial}$ of the modification coefficient $k_{mody}$ and varying forms thereof during parking will be described with reference to FIG. 6B. FIG. 6B illustrates an example in which the creep torque modifying unit according to an embodiment of the present disclosure changes the creep torque modification coefficient.

The initial value $k_{mody,initial}$ of the modification coefficient $k_{mody}$ can be set on the basis of a driver's driving style (e.g., APS/BPS operation pattern based learning). For example, a modification coefficient for a sporty driver may be greater than a modification coefficient for a gentle driver.

Figure 6B:
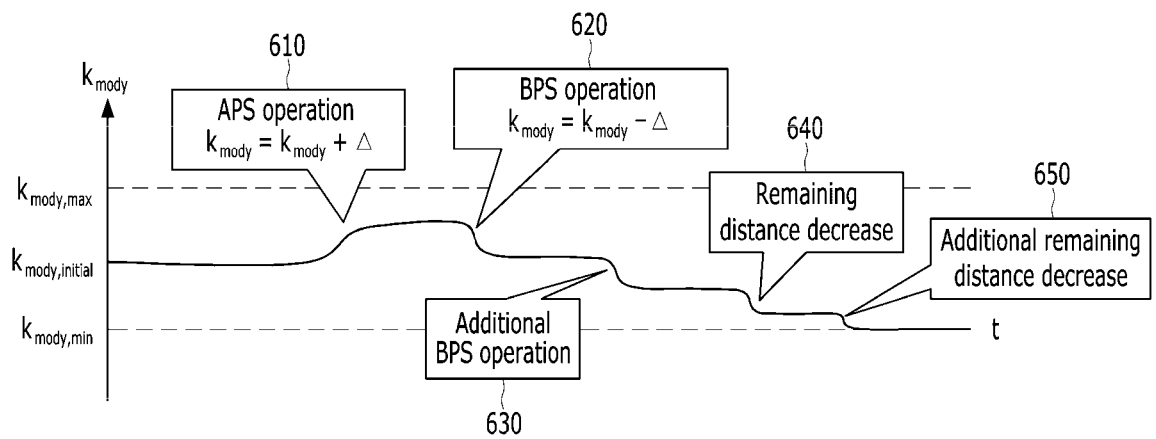
FIG. 6B illustrates an example in which the creep torque modifying unit according to an embodiment of the present disclosure changes a creep torque modification coefficient.

When the driver operates APS in a parking situation (610), as illustrated in FIG. 6B, the modification coefficient can be increased because the driver feels that the creep torque is insufficient. On the other hand, the modification coefficient can be decreased when BPS operation is performed (620) and can be additionally decreased when an additional operation (630) is performed. Here, increment or decrement A may depend on an operation amount or the number of operations. For example, A can increase as the operation amount increases.

Meanwhile, in a case where a remaining distance to a parking curb can be measured using a camera image and the like, when the remaining distance is less than a predetermined threshold value (640) and APS/BPS operation is not performed, the modification coefficient can be decreased as the remaining distance decreases (650) to reduce the creep torque before collision with the parking curb, minimizing impact.

The operation of the parking curb sensing unit 573 will be described with reference to FIG. 7.

Figure 7:
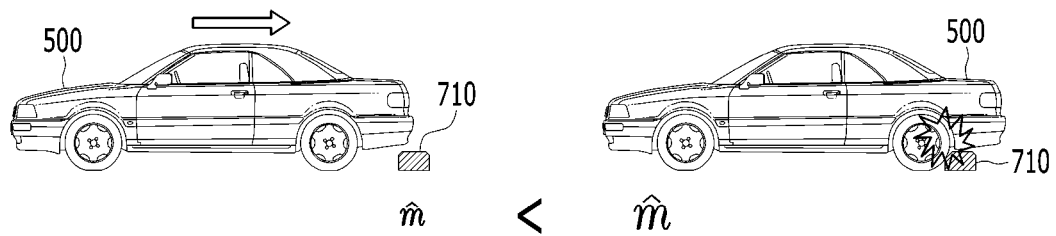
FIG. 7 illustrates an example of an operation of a parking curb sensing unit according to an embodiment of the present disclosure.
Figure 7:
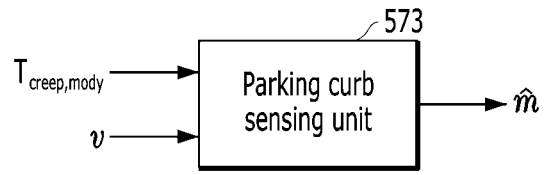

FIG. 7 illustrates an example of the operation of a parking curb sensing unit according to an embodiment of the present disclosure.

The parking curb sensing unit 573 can sense a parking curb using equivalent inertial change based on the weight (or a rate of change in the weight) of the vehicle. Specifically, as illustrated in the upper part of FIG. 7, equivalent inertia increases at the moment when the vehicle 500 reaches a parking curb 710 for parking due to sudden acceleration change. Using this principle, the parking curb sensing unit 573 can sense change in the weight of the vehicle on the basis of the modified creep torque $T_{creep,mody}$ modified by the creep torque modifying unit 571 and the vehicle speed. Although the actual vehicle weight is a physical value that does not change, change in the vehicle weight may mean change in the weight observed through calculation due to acceleration change in the present specification.

The weight of the vehicle can be represented by $$m = \frac{T_{creep,mody} / R_{tire}}{a}.$$

Here, a represents acceleration, m represents the weight of the vehicle, and $R_{tire}$ represents a dynamic radius of a tire. Accordingly, '$T_{creep,mody}/R_{tire}$' corresponds to a traction force of a wheel. The acceleration a of the vehicle is measured using a model (F=ma) or an acceleration sensor ($a_{Gsns}$) value instead of differentiation, and noise and distortion can be minimized by calculating a speed estimate using an acceleration and an acceleration estimate and correcting the acceleration estimate using an error between the speed estimate and an actual speed.

That is, since an acceleration estimate â can be corrected by adding a value based on a difference between a vehicle speed V and a speed estimate v̂ to an acceleration a, the speed estimate is obtained by integrating the acceleration estimate $$\left(i.e., \hat{v} = \int \hat{a} dt\right).$$

Consequently, the parking curb sensing unit 573 can determine that the vehicle has reached the parking curb when a value m̂ (i.e., observed weight) calculated by $$\frac{T_{creep,mody} / R_{tire}}{\hat{a}}$$

exceeds a predetermined value.

The operation of the creep torque controller 575 will be described with reference to FIGS. 8 and 9.

Figure 8:
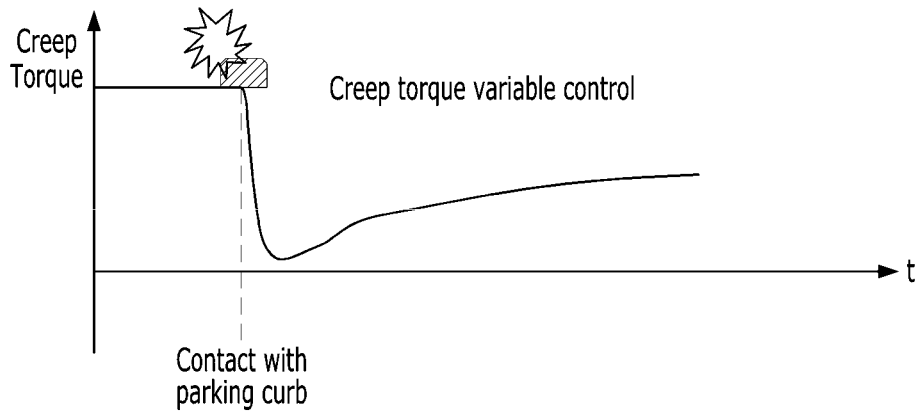
FIG. 8 illustrates an example of an operation of a creep torque controller according to an embodiment of the present disclosure.
Figure 8:
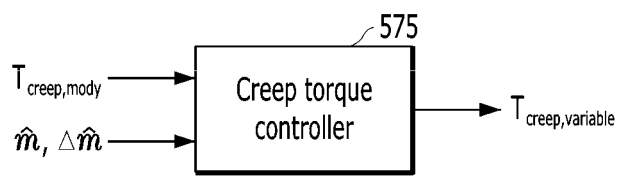

FIG. 8 illustrates an example of the operation of the creep torque controller according to an embodiment of the present disclosure.

Referring to FIG. 8, the creep torque controller 575 can variably control a creep torque according to conditions when the parking curb sensing unit 573 determines that the vehicle has reached a parking curb. To this end, the creep torque controller 575 can determine a variable control torque $T_{creep,variable}$ on the basis of the modified creep torque $T_{creep,mody}$, $\hat{m}$ and $\Delta\hat{m}$.

A more specific control form will be described with reference to FIG. 9. FIG. 9 is a diagram for describing creep torque variable control and effects thereof according to an embodiment of the present disclosure.

Figure 9:
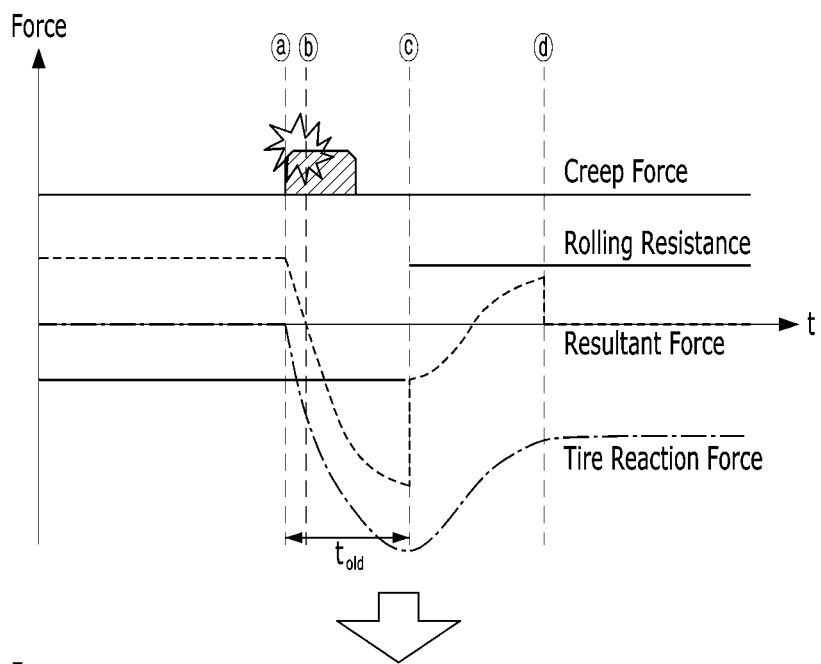
FIG. 9 is a diagram for describing variable creep torque control and effects thereof according to an embodiment of the present disclosure.
Figure 9:
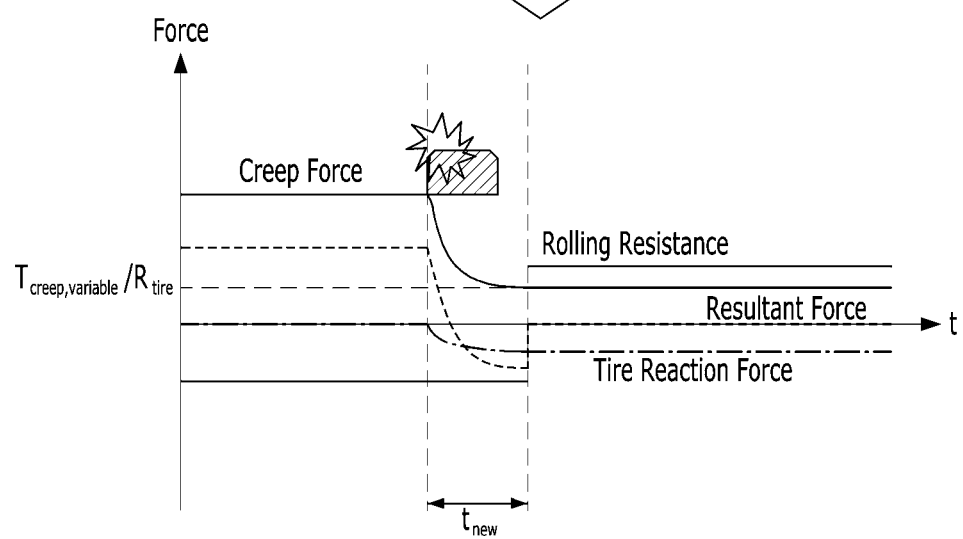

In FIG. 9, the upper part shows changes in physical quantities at the time of reaching a parking curb according to conventional control and the lower part shows changes in physical quantities at the time of reaching a parking curb according to an embodiment.

In the conventional control illustrated in the upper part, a tire reaction force due to tire deformation is considerable when a wheel reaches a parking curb ⓐ, and the vehicle stops after tire deformation additionally occurs ⓒ because the vehicle stills moves at the moment ⓑ when a resultant force becomes 0. Thereafter, the vehicle moves in the opposite direction because the tire reaction force is greater than the sum of a creep force and a rolling resistance. When the sum of the creep force and the tire reaction force becomes less than the rolling resistance at the time ⓓ when the vehicle stops, the vehicle remains in a stopped state. Here, $t_{old}$ represents a time from impact on the parking curb to initial stop of the vehicle.

On the other hand, the creep torque controller 575 according to an embodiment can sense collision with a parking curb on the basis of variation $\Delta\hat{m}$ of the calculated vehicle weight $\hat{m}$ and variably control the creep torque, as illustrated in the lower part of FIG. 9. The variable control torque $T_{creep,variable}$ is calculated by '$k_{variable}*k_{mody}*T_{creep}$', and a maximum value $k_{variable,max}$ of a variable coefficient $k_{variable}$ may be obtained through '$(T_{RollingResistance}-\text{margin})/T_{creep,mody}$' such that it does not exceed rolling resistance or a value predetermined through tests may be used as the maximum value $k_{variable,max}$. Here, when a filter is applied to the variable control torque $T_{creep,variable}$, different filter time constants may be applied according to driver's driving styles. For example, the time constant of a low pass filter (LPF) may be tuned to be $t_{old} \approx t_{new}$ for smooth riding, and the time constant may be tuned to be $t_{old} > t_{new}$ for rapid parking/stop in the case of a sporty driver.

Consequently, it is possible to reduce a tire deformation amount to decrease final impulse while maintaining speed reduction and to park/stop a vehicle more rapidly by applying a torque variably controlled by the creep torque controller 575 according to the embodiment, as illustrated in FIG. 9.

A creep torque finally determined by the hybrid controller unit 570 can be transmitted to the motor control unit 550 in the form of a torque command, and the motor control unit 550 can control the creep torque of the electric motor according to the torque command.

Figure 10:
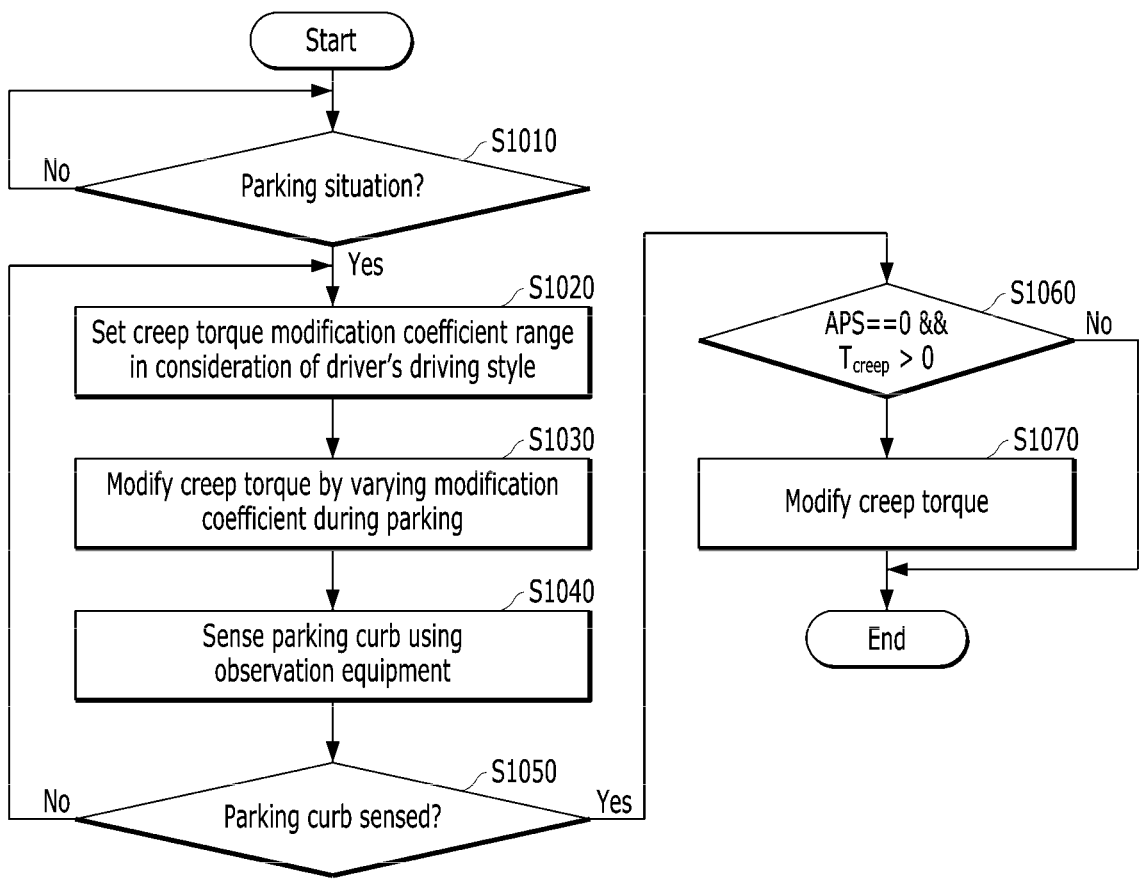
FIG. 10 is a flowchart illustrating an example of a parking control process according to an embodiment of the present disclosure.

A parking control process including the above-described creep torque control process according to an embodiment is illustrated as a flowchart in FIG. 10.

FIG. 10 is a flowchart illustrating an example of a parking control process according to an embodiment of the present disclosure.

Referring to FIG. 10, in the parking control process according to an embodiment, the creep torque modifying unit 571 may determine whether a parking situation occurs at S1010.

Upon determining that a parking situation occurs, the creep torque modifying unit 571 sets a range of a creep torque modification coefficient (i.e., $k_{mody.initial}$, $k_{mody,min}$, $k_{mody,max}$) in consideration of a driver's driving style at S1020 and modifies a creep torque while varying the modification coefficient on the basis of whether APS or BPS is operated, a distance to a parking curb, and the like while parking is performed at S1030.

In addition, the parking curb sensing unit 573 observes change in the vehicle weight $\hat{m}$ calculated on the basis of the modified creep torque and the vehicle speed at S1040 to determine whether the vehicle reaches the parking curb at S1050.

When the parking curb sensing unit 573 senses arrival at the parking curb (Yes in S1050), the creep torque controller 575 variably controls the creep torque for smooth stop in a case where the creep torque is greater than 0 in a state in which the accelerator pedal is not operated (Yes in S1060), and in a case where APS is operated (No in S1060), ends creep torque control by reflecting the intention of the driver. The creep torque is modified at S1070.

The operation of varying the modification coefficient in the creep torque modifying step S1030 will be described with reference to FIG. 11.

Figure 11:
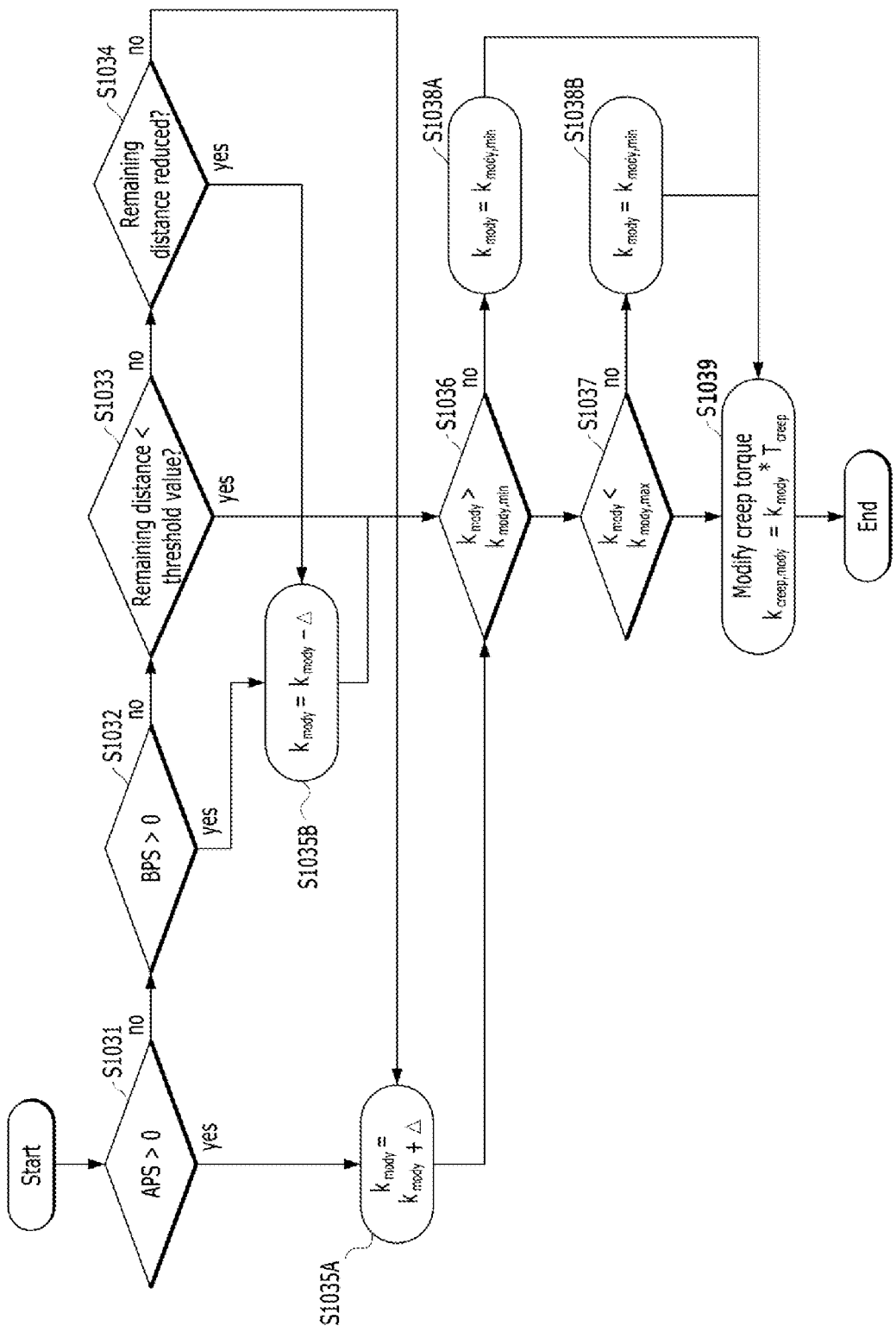
FIG. 11 is a flowchart for describing step S1030 of FIG. 10.

Referring to FIG. 11, the modification coefficient increases at S1035A when the accelerator pedal is operated (Yes in S1031) and decreases at S1035B when the brake pedal is operated (Yes in S1032). Further, the modification coefficient may decrease at S1035B when a remaining distance to a parking curb decreases in a state in which the remaining distance is less than a threshold value (Yes in S1033) and increase at S1035A when the remaining distance increases.

If no pedal is operated and the remaining distance to the parking curb is equal to or greater than the threshold value (No in S1033) or when the modification coefficient is adjusted (S10354A and S1035B), the modification coefficient is maintained such that it does not decrease to be lower than a minimum value (No in S1036→S1038A) and does not exceed a maximum value (Yes in S1036→No in S1037→S1038B). When the modification coefficient is between the maximum value and the minimum value (Yes in S1037), the creep torque modifying unit can apply the modification coefficient to the creep torque to determine a modified creep torque at S1039.

According to creep torque control according to the above-described embodiment, a driving system of a vehicle can be protected from a load due to collision between a parking curb and wheels and the parking curb can be prevented from being damaged. In addition, impact applied when the P stage is released is reduced and thus inconvenience of a driver can be decreased and the commercial value of the vehicle can be improved, and collision with surrounding objects due to running over a parking curb can also be prevented.

Although the present disclosure has been described above on the basis of an eco-friendly vehicle including an electric motor imitating a creep torque, the present disclosure can be applied to any vehicle which imitates a creep torque through other power sources such as a motor because a creep torque caused by a power source such as an engine is not naturally generated therein. Furthermore, the parking curb is exemplary and the present disclosure can be applied to any object (e.g., a stone, a crack in the ground, and the like) that applies a reaction force to at least one wheel in a parking direction during parking.

The above-described present disclosure can be realized as computer-readable code in a medium in which a program is recorded. Computer-readable media include all kinds of recording devices in which data readable by computer systems is stored. Examples of computer-readable media include a hard disk drive (HDD), a solid state drive (SSD), a silicon disk drive (SYD), a ROM, a RAM, a CD-ROM, a magnetic tape, a floppy disk, an optical data storage device, etc.

Therefore, the above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A parking control method for a vehicle imitating a creep torque using an electric motor, the method comprising:
    determining whether a parking situation occurs;
    applying a creep torque modification coefficient to a creep torque to determine a modified creep torque upon determining that the parking situation occurs; and
    variably controlling the creep torque by applying a variable coefficient to the modified creep torque when a contact with an object that applies a reaction force to a wheel in a parking direction is sensed so that the creep torque is reduced.

2. The parking control method according to claim 1, wherein the method further comprises sensing the contact with the object based on a change in a weight of the vehicle based on a calculation of an acceleration and the modified creep torque.

3. The parking control method according to claim 1, wherein the determining of whether the parking situation occurs is performed based on at least one of whether a parking assistance function is operated, presence or absence of parking lots or charging stations based on maps, and whether parking lines or parking curbs are detected from an image.

4. The parking control method according to claim 1, wherein the determining of the modified creep torque comprises adjusting the creep torque modification coefficient based on whether an accelerator pedal is operated, whether a brake pedal is operated, and a distance to the object.

5. The parking control method according to claim 4, wherein the adjusting of the creep torque modification coefficient comprises increasing the creep torque modification coefficient when the accelerator pedal is operated, or decreasing the creep torque modification coefficient when the brake pedal is operated.

6. The parking control method according to claim 4, wherein the adjusting of the creep torque modification coefficient comprises decreasing the creep torque modification coefficient when the distance to the object decreases and the distance to the object is within a threshold distance, or increasing the creep torque modification coefficient when the distance to the object increases and the distance to the object is within the threshold distance.

7. The parking control method according to claim 1, wherein the determining of the modified creep torque comprises:
    determining a maximum value and a minimum value of the creep torque modification coefficient; and
    maintaining the creep torque modification coefficient between the maximum value and the minimum value.

8. The parking control method according to claim 1, wherein the variably controlling of the creep torque comprises multiplying the modified creep torque by the variable coefficient,
    wherein a maximum value of the variable coefficient is determined such that the maximum value does not cause a force of the creep torque to exceed a force of a rolling resistance.

9. The parking control method according to claim 1, wherein the object that applies the reaction force includes a parking curb.

10. A non-transitory computer-readable recording medium storing a program for executing the parking control method including the steps of:
    determining whether a parking situation occurs;
    applying a creep torque modification coefficient to a creep torque to determine a modified creep torque upon determining that the parking situation occurs; and
    variably controlling the creep torque by applying a variable coefficient to the modified creep torque when a contact with an object that applies a reaction force to a wheel in a parking direction is sensed so that the creep torque is reduced.

11. A vehicle imitating a creep torque using an electric motor, the vehicle comprising:
    a creep torque modifying unit configured to determine whether a parking situation occurs, and apply a creep torque modification coefficient to a creep torque to determine a modified creep torque upon determining the parking situation;
    a sensing unit configured to sense contact with an object that applies reaction force to a wheel in a parking direction while the creep torque modifying unit determines the modified creep torque; and
    a creep torque controller configured to variably control the creep torque by applying a variable coefficient to the modified creep torque when the sensing unit senses contact with the object so that the creep torque is reduced.

12. The vehicle according to claim 11, wherein the sensing unit determines contact with the object based on a change in a weight of the vehicle based on a calculation of an acceleration and the modified creep torque.

13. The vehicle according to claim 11, wherein the creep torque modifying unit determines whether the parking situation occurs based on at least one of whether a parking assistance function is operated, presence or absence of parking lots or charging stations based on maps, and whether parking lines or parking curbs are detected from an image.

14. The vehicle according to claim 11, wherein the creep torque modifying unit adjusts the creep torque modification coefficient based on whether an accelerator pedal is operated, whether a brake pedal is operated, and a distance to the object.

15. The vehicle according to claim 14, wherein the creep torque modifying unit increases the creep torque modification coefficient when the accelerator pedal is operated, or decreases the creep torque modification coefficient when the brake pedal is operated.

16. The vehicle according to claim 14, wherein the creep torque modifying unit decreases the creep torque modification coefficient when the distance to the object decreases and the distance to the object is within a threshold distance, or increases the creep torque modification coefficient when the distance to the object increases and the distance to the object is within the threshold distance.

17. The vehicle according to claim 11, wherein the creep torque modifying unit determines a maximum value and a minimum value of the creep torque modification coefficient and maintains the creep torque modification coefficient between the maximum value and the minimum value.

18. The vehicle according to claim 11, wherein the creep torque controller multiplies the modified creep torque by the variable coefficient to determine a variable control torque,
   wherein a maximum value of the variable coefficient is determined such that the maximum value does not cause a force of the creep torque to exceed a force of a rolling resistance.

19. The vehicle according to claim 11, wherein the object that applies the reaction force includes a parking curb.

\* \* \* \* \*